US011879628B1

(12) United States Patent
Zheng et al.

(10) Patent No.: US 11,879,628 B1
(45) Date of Patent: Jan. 23, 2024

(54) HEAT-DISSIPATING LAMP STRUCTURE

(71) Applicant: FUJIAN OUMEIDA ELECTRIC MACHINE CO., LTD., Fuan (CN)

(72) Inventors: Yao Fu Zheng, Fuan (CN); Qi Heng Guo, Fuan (CN)

(73) Assignee: FUJIAN OUMEIDA ELECTRIC MACHINE CO., LTD., Fuan (CN)

( * ) Notice: Subject to any disclaimer, the term of this patent is extended or adjusted under 35 U.S.C. 154(b) by 0 days.

(21) Appl. No.: 17/888,761

(22) Filed: Aug. 16, 2022

(51) Int. Cl.

| | |
|---|---|
| ***F21V 29/71*** | (2015.01) |
| ***F21V 29/83*** | (2015.01) |
| ***F21V 29/75*** | (2015.01) |
| ***F21S 4/28*** | (2016.01) |

(52) U.S. Cl.
CPC ............ *F21V 29/713* (2015.01); *F21V 29/75* (2015.01); *F21V 29/83* (2015.01); *F21S 4/28* (2016.01)

(58) Field of Classification Search
CPC ........ F21V 29/713; F21V 29/83; F21V 29/75; F21V 29/76; F21V 29/763; F21V 29/77; F21V 29/773; F21V 23/002; F21V 23/023; F21V 23/026; F21Y 2103/10; F21Y 2103/20; F21S 4/20; F21S 4/28
See application file for complete search history.

(56) References Cited

U.S. PATENT DOCUMENTS

| | | | | |
|---|---|---|---|---|
| 2010/0110683 A1* | 5/2010 | Fang | ........................ | F21V 29/76 362/249.02 |
| 2012/0033431 A1* | 2/2012 | Martinez | ................ | H05K 13/04 362/294 |
| 2016/0040839 A1* | 2/2016 | Driscoll | ................ | F21V 29/767 362/294 |
| 2020/0103104 A1* | 4/2020 | Cercone | ................ | F21V 15/015 |
| 2021/0080091 A1* | 3/2021 | Gao | ....................... | F21V 23/002 |
| 2021/0116121 A1* | 4/2021 | Xu | .......................... | F21K 9/275 |

FOREIGN PATENT DOCUMENTS

| | | | |
|---|---|---|---|
| CN | 109488918 A * | 3/2019 | ................ F21S 4/20 |

* cited by examiner

*Primary Examiner* — Erin Kryukova
(74) *Attorney, Agent, or Firm* — Best & Flanagan LLP

(57) ABSTRACT

The present invention discloses is an easy heat-dissipating lamp structure, comprising an outer shell. Inside the upper half space of the outer shell, there are multiple rib plates formed in the direction from top to bottom, so that multiple vertical gaps are formed. A heat dissipator is held inside the lower half space of the outer shell, leaning and fixed on the lower edge of the rib plates. The bottom face of the heat dissipator is attached with a light emitting plate. The heat generated by the light emitting plate is received by the heat dissipator and is discharged through the vertical gaps between the multiple rib plates.

5 Claims, 6 Drawing Sheets

HEAT-DISSIPATING LAMP STRUCTURE

FIELD OF THE INVENTION

The present invention relates to an easy heat-dissipating lamp structure, and more particularly to a lamp structure with easy heat-dissipation enabling to improve the effect of heat dissipation of the lamp and further enhance the using efficiency and life of the lamp.

Description of Related Art

A lamp is a device that converts electrical energy into optical energy. A conventional lamp normally has an outer shell. Inside the shell, a light-emitting component (can be in any light-emitting mode) is installed. The shell can be installed at any position (e.g., the ceiling or any other positions with no limitation). The light-emitting component is connected through a power cord to an external power source (e.g., commercial power or any other power sources with no limitation), which powers the lamp to emit light. Thus, by controlling the switch of the power source, the electricity supplied to the light-emitting component can be connected or disconnected, so that it is turned on or off.

The light-emitting component inside the lamp device converts electrical energy into optical energy. During the conversion, thermal energy is generated. The current advanced technology can already convert electrical energy into optical energy efficiently. However, in spite of the high efficiency, the generation of thermal energy is inevitable. Therefore, in the development of light-emitting components and/or lamp devices, it has always been an aim to reduce the thermal energy generated by the light-emitting component or to quickly dissipate the heat inside the lamp device. The outer shell of a lamp device is usually formed by mold casting. Therefore, the outer shell is always a solid wall body. After the necessary components like the light-emitting component are installed inside the outer shell, a heat-dissipating component will be installed. One common example is light-emitting component with aluminum fins which helps dissipating the heat generated by the light-emitting component, so that the light-emitting component can work in a normal condition. However, in such a structure, the heat is only dissipated from the light-emitting component and is still kept inside the outer shell, After long time of use, the efficiency and service life of the overall lamp device will still be reduced. Obviously, in terms of heat dissipation for the whole lamp device, the prior-art lamp device is not ideal and needs to be improved.

SUMMARY OF THE INVENTION

In view of the fact that the heat-dissipating efficiency of the prior-art lamp device is low, the present invention provides an improved design for the structure of the lamp device, so as to overcome the above problem. This invention is a result of a great amount of effort.

Therefore, the main object of the invention is to provide an easy heat-dissipating lamp structure to improve the heat dissipation efficiency, enhance the functional performance, and extend the service life of the lamp device.

To achieve the above-mentioned objective, the present invention provides an easy heat-dissipating lamp structure, made up of at least an outer shell, a heat dissipator, a light emitting plate, and a power connection cord, the inside of the outer shell is divided into an upper half space and a lower half space, inside the upper half space of the outer shell, multiple rib plates are formed, the heat dissipator is in the shape of a flat plate, placed in from the lower half space of the outer shell, and is attached to the lower edge of the multiple rib plates, the light emitting plate is in the shape of a flat plate, made up of a plate body and multiple light-emitting components, the multiple light-emitting components are installed below the plate body, the light emitting plate is placed from the lower half space of the outer shell, and is attached and fixed on the bottom face of the heat dissipator, the power connection cord goes from above the outer shell into the space between the rib plates, and extends to the light-emitting component for electrical connection, the lamp device structure is characterized in that: the multiple rib plates inside the outer shell are all formed in straight shapes extending from top to bottom, straight and vertical gaps are formed between the rib plates, the heat generated by the multiple light-emitting components during operation is received by the heat dissipator, and is discharged through the straight gaps between the multiple rib plates.

According to the above-mentioned easy heat-dissipating lamp structure, wherein the outer shell is divided into long side walls located on the left and right sides, short side walls located on the front and rear sides, and multiple rib plates located inside, the outer face of the long side wall is respectively provided with an insertion slot going upward at position near the front end and the rear end, the lower end is extended outward to form a shield wall, the upper half part of the short side wall is a wall body, and the lower half part is a port, specifically, the wall body of the short side wall is provided with a crevice, the inside of the outer shell is divided into an upper half space and a lower half space, the multiple rib plates are formed inside the upper half space of the outer shell, and are formed between the two insertion slots on the same side, inside the upper half space of the outer shell, the lower edge on the outside of the insertion slot is formed with a middle plate, the middle plate is connected between the outermost rib plate and the short side wall, specifically, a dent is formed on the middle plate at the position corresponding to the crevice of the short side wall, and a through hole is formed on the outermost rib plate at the position corresponding to the crevice, the lower half space of the outer shell is communicated to the ports of the front and rear ends, the bottom of the outer shell is configured with multiple first connection slots, the middle position of the outermost rib plate is configured with a second connection slot, and the middle position of the long side wall is configured with a third connection slot.

According to the above-mentioned easy heat-dissipating lamp structure, wherein the end face of the short side wall can be connected with a side cap to cover the wall body of the upper half part, the port and the crevice of the lower half part, the top face of the side cap is configured with a connection hole, which can be aligned to the second connection slot, and a connecting component can go through the connection hole and be locked with the connection slot.

According to the above-mentioned easy heat-dissipating lamp structure, wherein the heat dissipator is formed in the shape of a flat plate using aluminum-based materials, the positions on the two sides corresponding to the insertion slot of the outer shell is configured with a clamping slot, an open slot is provided respectively on the edges of the two ends, specifically, the position of the open slot corresponds to the dent, the heat dissipator is sporadically configured with several perforations, and the position of the perforation corresponds to the above-mentioned first connection slot, when the heat dissipator is placed in from the lower half space of the outer shell, each clamping slot clamps the corresponding insertion slot, one open slot is aligned with the dent of the middle plate, the perforations are all aligned to the first connection slot, the light emitting plate is made up of a plate body and multiple light-emitting components, the light-emitting component is installed below the plate body, a clamping slot is configured at the position corresponding to the clamping slot of the heat dissipator on the two sides of the light emitting plate, an open slot is configured at the position corresponding to the open slot of the heat dissipator on the two end edges, specifically, the open slot is aligned to the dent, the light emitting plate is sporadically configured with several perforations, the perforations are aligned to the perforations of the heat dissipator, when the light emitting plate is placed in from the lower half space of the outer shell and is attached on the bottom face of the heat dissipator, the clamping slot of the light emitting plate and the clamping slot of the heat dissipator correspondingly clamp the insertion slot of the outer shell, one open slot of the light emitting plate is aligned to the open slot corresponding to the heat dissipator, and the dent of the middle plate of the outer shell, the perforation of the light emitting plate and the perforation of the heat dissipator are aligned to the first connection slot.

According to the above-mentioned easy heat-dissipating lamp structure, wherein the lamp device further comprises a reflector plate and a cup plate, the plate body of the reflector plate is arranged with multiple reflectors and multiple connection holes, the reflector corresponds to the light-emitting component of the light emitting plate, the connection hole corresponds to the perforation of the light emitting plate, the left side and right side of the reflector plate is formed with raised plates, the reflector plate is placed in from the lower half space of the outer shell, when the through hole on the reflector holds the corresponding light-emitting component inside, a connecting component can be inserted from the downside upward, passing the connection hole of the reflector plate, the perforation of the light emitting plate, the perforation of the heat dissipator, and be locked with the first connection slot.

According to the above-mentioned easy heat-dissipating lamp structure, wherein the lamp device further comprises a spring clip, the spring clip is a plate extending downward and then outward and upward for several cycles so that becomes elastic, the inner end face of the spring clip is provided with a connection hole, When the inner end face of the spring clip is attached to the central point of the long side wall, the connection hole of the spring clip corresponds to the third connection slot, and a connecting component can be inserted from downside upward, passing through the connection hole of the spring clip, and be locked with the third connection slot.

DETAILED DESCRIPTION OF EMBODIMENTS OF THE INVENTION

The technical means to realize the above object and the expected functional performance are described in detail below, with respect to the preferred embodiment and with reference to the accompanying drawings, so that they can be readily understood.

Figure 1:
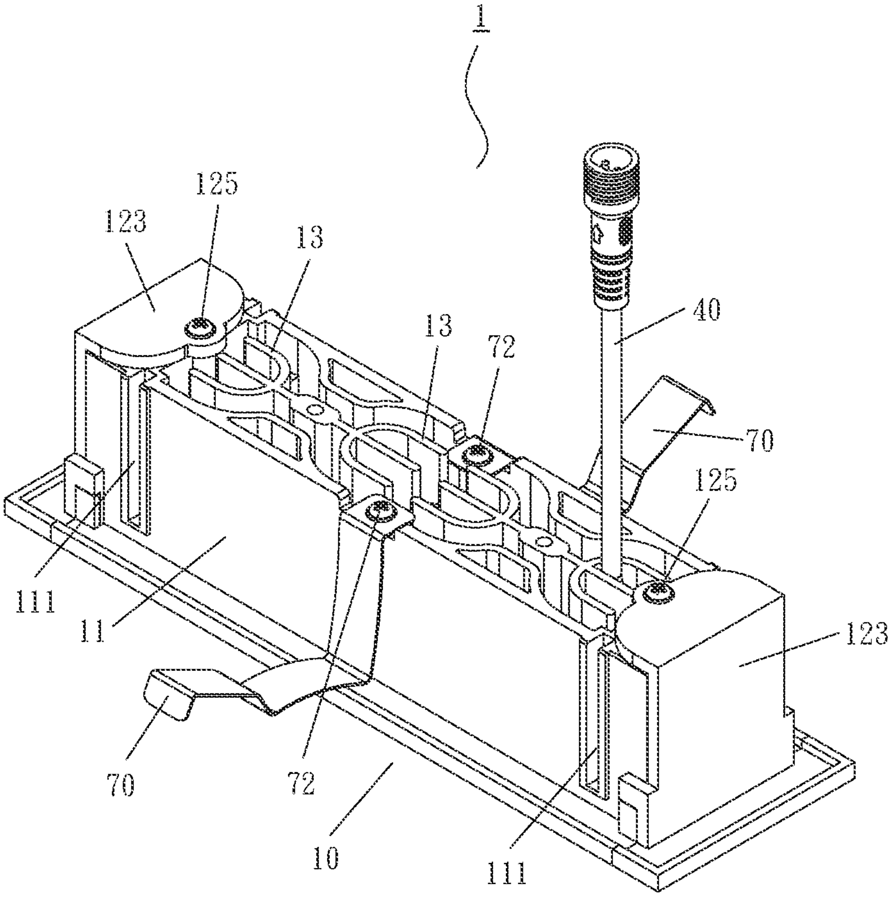
FIG. 1 is a perspective view of the invention.
Figure 2:
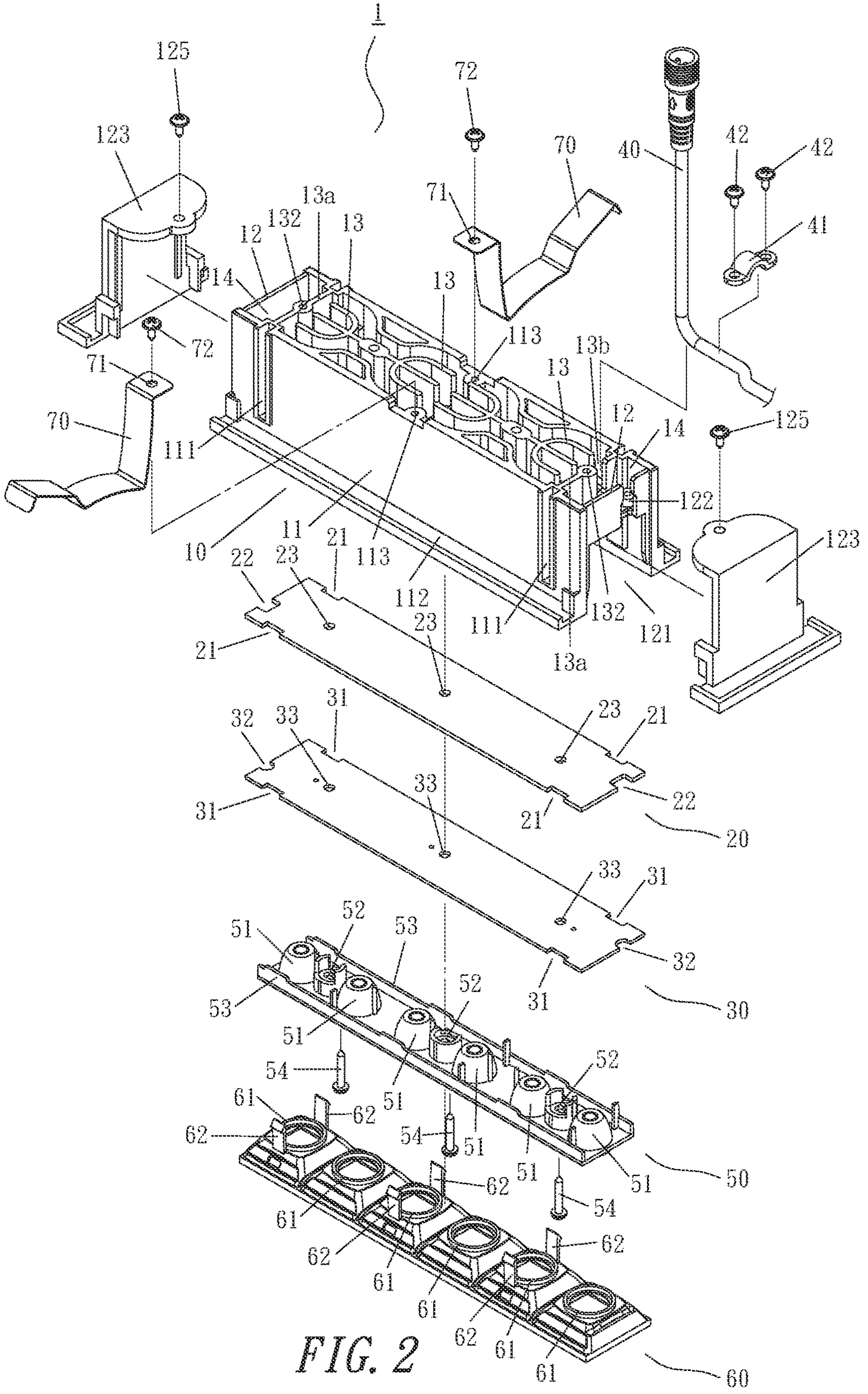
FIG. 2 is an exploded perspective view of the invention.

Referring to FIGS. 1-2, the embodiment of the invention is a lamp device 1, mainly comprising an outer shell 10, a heat dissipater 20, a light emitting plate 30, a power connection cord 40, a reflector plate 50, a cup plate 60 and a spring clip 70.

Figure 3:
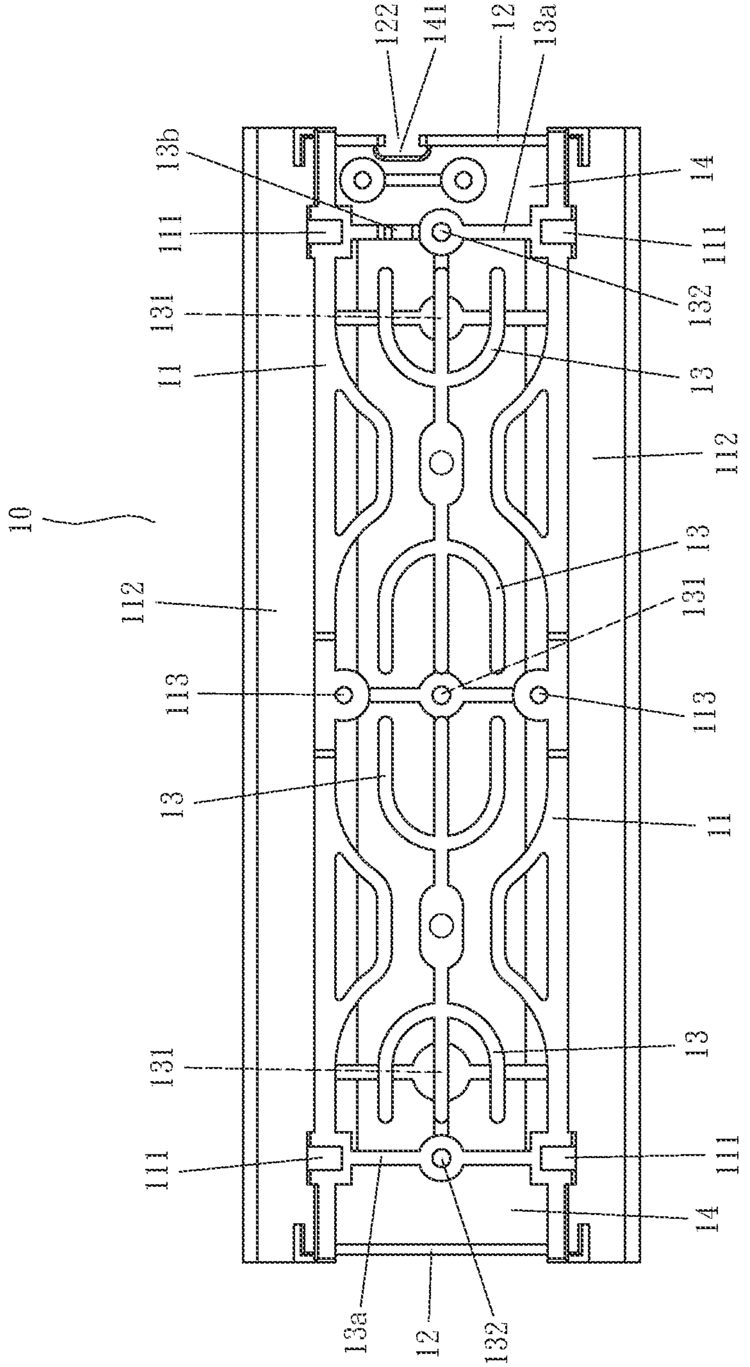
FIG. 3 is a top view of the outer shell in the invention.
Figure 4:
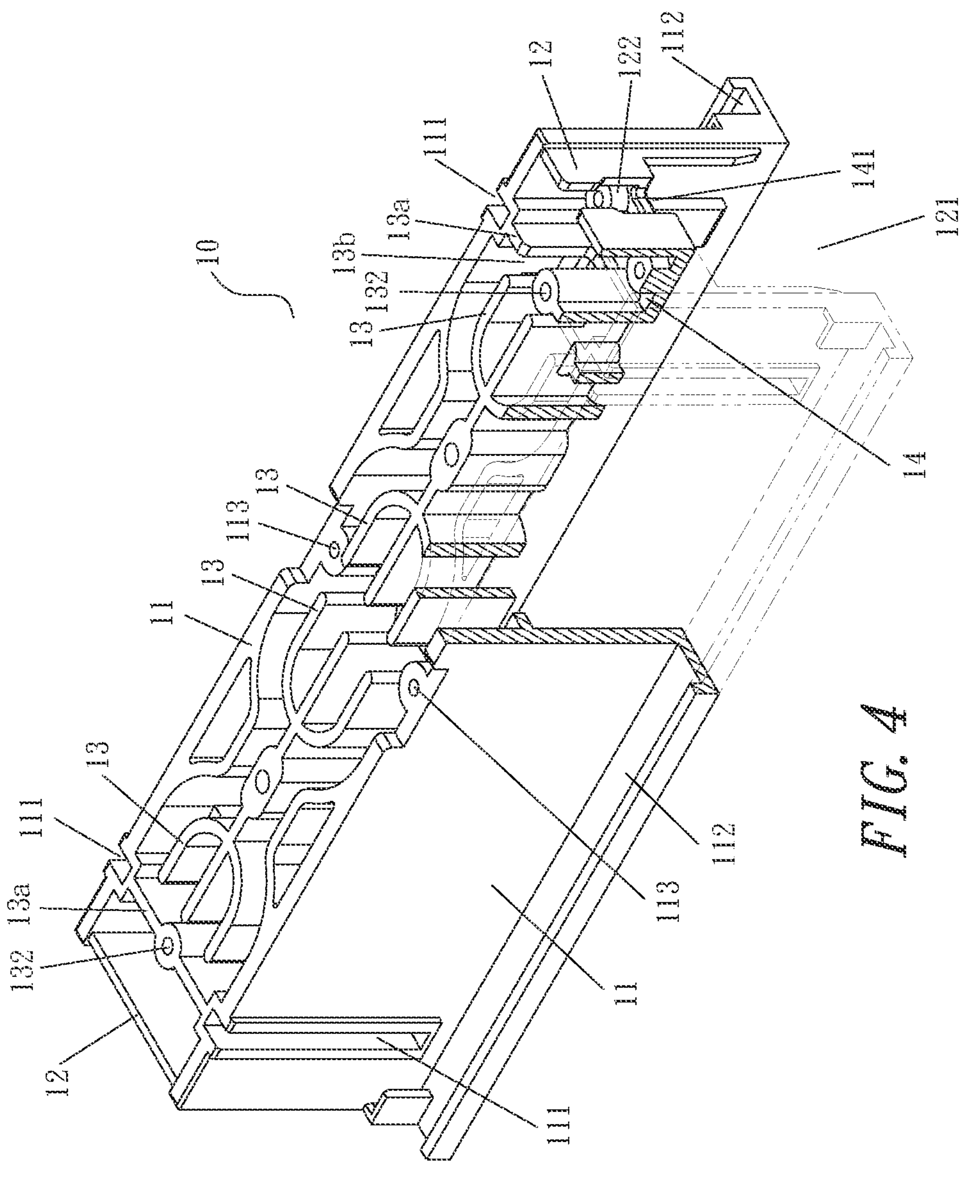
FIG. 4 is a partial sectional perspective view of the outer shell in the invention.
Figure 5:
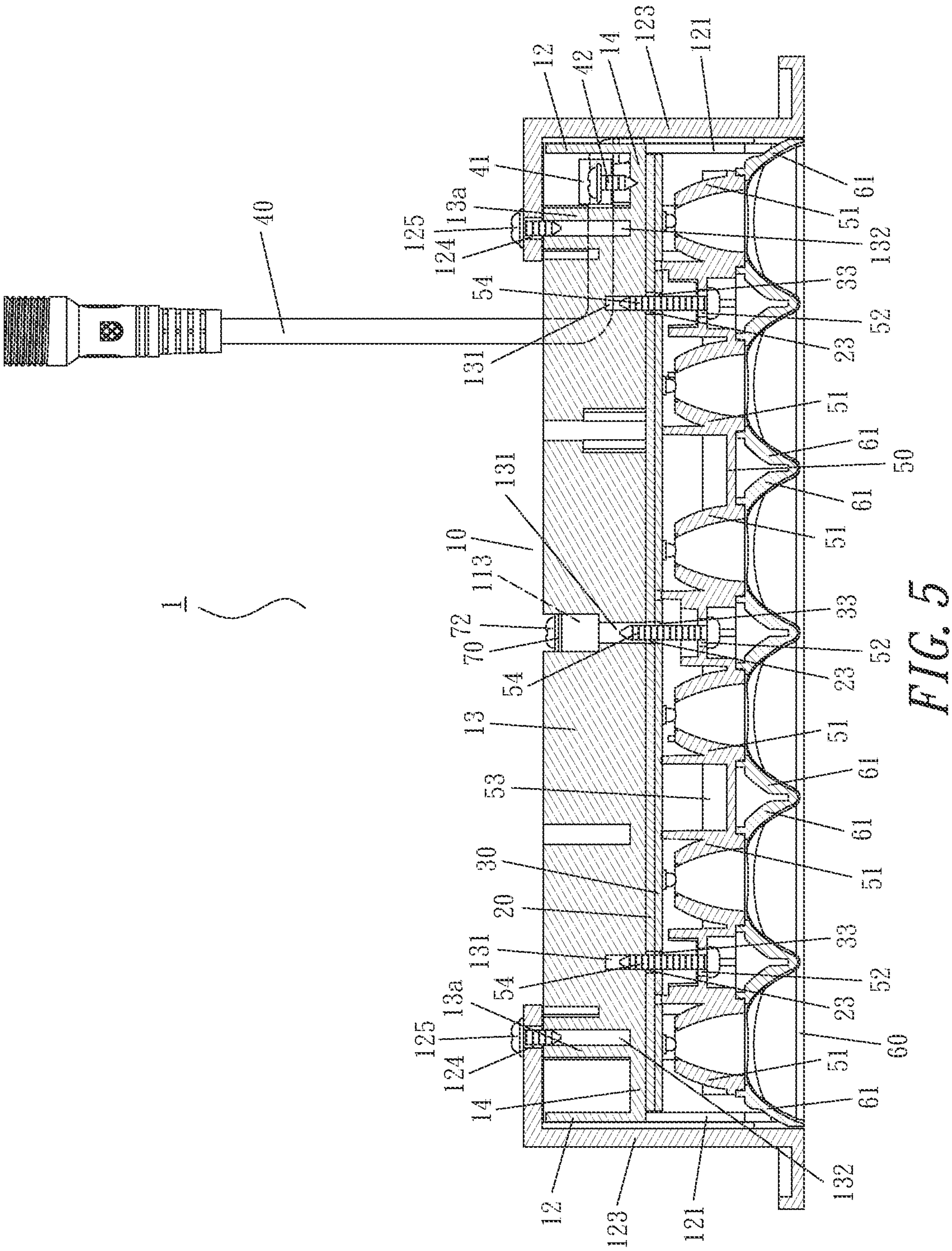
FIG. 5 is a vertical sectional view of the invention.

Referring to FIGS. 3-4, the outer shell 10 is divided into long side walls 11 located on the left and right sides, short side walls 12 located on the front and rear sides, and multiple rib plates 13 located inside. The outer wall of the long side wall 11 is respectively provided with an upward open insertion slot 111 at positions close to the front end and rear end. The lower end edge is extended outward to form a shield wall 112. The upper half part of the short side wall 12 is a wall body, the lower half part is a port 121. Specifically, the wall body of one short side wall 12 is configured with a crevice 122. The inside of the outer shell 10 is divided into upper half space and lower half space. The multiple rib plates 13 are formed inside the upper half space of the outer shell 10, and are formed between the two insertion slots 111 on the same side. The multiple rib plates 13 are formed in a straight shape in the vertical direction, and multiple straight gaps are formed between them, for air to flow in the vertical direction. The multiple rib plates 13 can be vertical, horizontal or curved, with no limitation of their shapes. Inside the upper half space of the outer shell 10, the lower edge of the part outside the insertion slot 111 is formed with a middle plate 14. The middle plate 14 is connected between the outermost rib plate 13*a* and the short side wall 12 (as shown in FIG. 3-4). Specifically, on the middle plate 14, a dent 141 is configured at the position corresponding to the crevice 122 of the short side wall 12. On the outermost rib plate 13*a*, a through hole 13*b* is configured at the position corresponding to the crevice 122. The lower half space of the outer shell 10 is a hollow space, and is communicated to the port 121 of the front and rear ends. Inside the outer shell 10, the bottom of an appropriate position of the vertical rib plate 13*a* is configured with multiple first connection slots 131 facing inward (as shown in FIG. 5). The middle position of the outermost rib plates 13*a* is configured with a straight second connection slot 132. The slightly inward central point of the long side wall 11 is configured with a straight third connection slot 113. The end face of the short side wall 12 can be connected with a side cap 123 to block the wall body of the upper half part, the port 121 of the lower half part, and the crevice 122. The top face of the side cap 123 is configured with a connection hole 124, which can be aligned to the second connection slot 132. A connecting component 125 (e.g., a screw, with no limitation) can go through the connection hole 124 and be locked with the connection slot 132.

Referring to FIG. 5, the heat dissipator 20 is made of an aluminum-based material and formed in the shape of a flat plate. The positions on the two sides corresponding to the insertion slot 111 of the outer shell 10 are both configured with a clamping slot 21. The two end edges are respectively configured with an open slot 22. Specifically, the position of one open slot 22 is aligned and put together with the dent 132. The plate body of the heat dissipator 20 is sporadically arranged with several perforations 23. The position of each perforation 23 is aligned to the above-mentioned first connection slot 131. During assembly, the heat dissipator 20 is inserted from the lower half space of the outer shell 10, and is attached on the lower edge of the multiple rib plates 13, Each clamping slot 21 clamps the corresponding insertion slot 111. One open slot 22 is aligned and put together with dent 141 of the middle plate 14. Meanwhile, each perforation 23 is aligned to a first connection slot 131.

The light emitting plate 30 is made of a metallic material and is formed in the shape of a flat plate. It comprises a plate body and multiple light-emitting components. The multiple light-emitting components are installed under the plate body. The light-emitting components are of a small body. Therefore, when the multiple light-emitting components are installed under the plate body, they only protrude slightly below the plate body. The multiple light-emitting components are collectively connected to the power source, and the conductive wire is buried inside the plate body. On the two sides of the light emitting plate 30 and at the position corresponding to the clamping slot 21 of the heat dissipator 20, a clamping slot 31 is provided. The two end edges are also provided with an open slot 32 respectively. The position of each open slot 32 is aligned to the open slot 22 of the heat dissipator 20. Therefore, one open slot 32 will be aligned to the dent 132. The plate body of the light emitting plate 30 is sporadically distributed with several perforations 33. The position of each perforation 33 corresponds to the above-mentioned perforation 22. During assembly, the light emitting plate 30 is placed in from the lower half space of the outer shell 10, and is attached to the bottom face of the heat dissipator 20. Now, each of the clamping slots 31 and the corresponding clamping slots 21 work together to clamp the insertion slot 111. One open slot 32 and the corresponding open slot 22 are both aligned to the dent 141 of the middle plate 14. Meanwhile, each perforation 33 and the corresponding perforation 23 are both aligned to a first connection slot 131.

The power connection cord 40 is in the shape of a bar and has an appropriate hardness. Its top end is connected to an external power source (e.g., commercial power, with no limitation), so as to power the light-emitting component of the light emitting plate 30 to emit light. The tail end of the power connection cord 40 enters from the top downward from the space in the rib plate 13 adjacent to the through hole 13*b*, and is bent to the horizontal direction to go through the through hole 13*b*, and continues to enter the range of the middle plate 14. When touching the position of the dent 141, it is bent downward to go through the dent 141 and the crevice 122, and continues to go through the open slot 22 and the open slot 32. Then, when passing the open slot 32, it is electrically connected to the light-emitting component of the light emitting plate 30. Then, within the range of the middle plate 14, a pressing plate 41 is used to press the power connection cord 40 from above, and a pair of connecting components 42 (e.g., screws, with no limitation) are inserted through the two ends of the pressing plate 41 and are fixed with the middle plate 14, so that the power connection cord 40 is well positioned.

The reflector plate 50 is formed by distributing multiple reflectors 51 and multiple connection holes 52 on a plate body. The positions of the multiple reflectors 51 are aligned to the light-emitting components of the light emitting plate 30. The positions of the multiple connection holes 52 are aligned to the perforations 33 of the light emitting plate 30. The left, and right sides of the reflector plate 50 are formed with protruding plates 53 raised upward. During assembly, the reflector plate 50 is placed from the lower half space of the outer shell 10, so that the through hole on the multiple reflectors 51 covers the corresponding light-emitting component, so that the light emitted by the light-emitting component can fully enter the reflector 51, and can provide illumination under the guide of the reflector 51. Meanwhile, when the multiple connection holes 52 are aligned to the perforations 33 of the light emitting plate 30, a connecting component 54 (e.g., a screw, with no limitation) can be inserted from blow to go through the connection hole 52, the perforation 33, and the perforation 23 and be locked with the first connection slot 131.

The plate body of the cup plate 60 is arranged with multiple cups 61 and multiple locking bars 62. The positions of the multiple cups 61 correspond to the multiple reflectors 51. During assembly, the cup plate 60 is placed in from the lower half space of the outer shell 10, so that the multiple cups 61 are supported on the bottom edge of the reflector 51. The multiple locking bars 62 are inserted from the gap between the protruding plate 53 and the outer shell 10, and are connected and fixed with the outer shell 10, so that the light passing the reflector 51 will have an expanded illumination range under the guide of outward expanding curved edge the cup 61.

The spring clip 70 is a plate extending downward and then outward and upward for several cycles to have an elasticity. The inner end face of the spring clip 70 is provided with a connection hole 71. During assembly, the inner end face of the spring clip 70 is attached to the center position of the long side wall 11, so that the connection hole 71 is aligned to the third connection slot 113. Thus, a connecting component 72 (e.g., a screw, with no limitation) can be inserted from below to go through the connection hole 71 and be fixed with the third connection slot 113.

Figure 6:
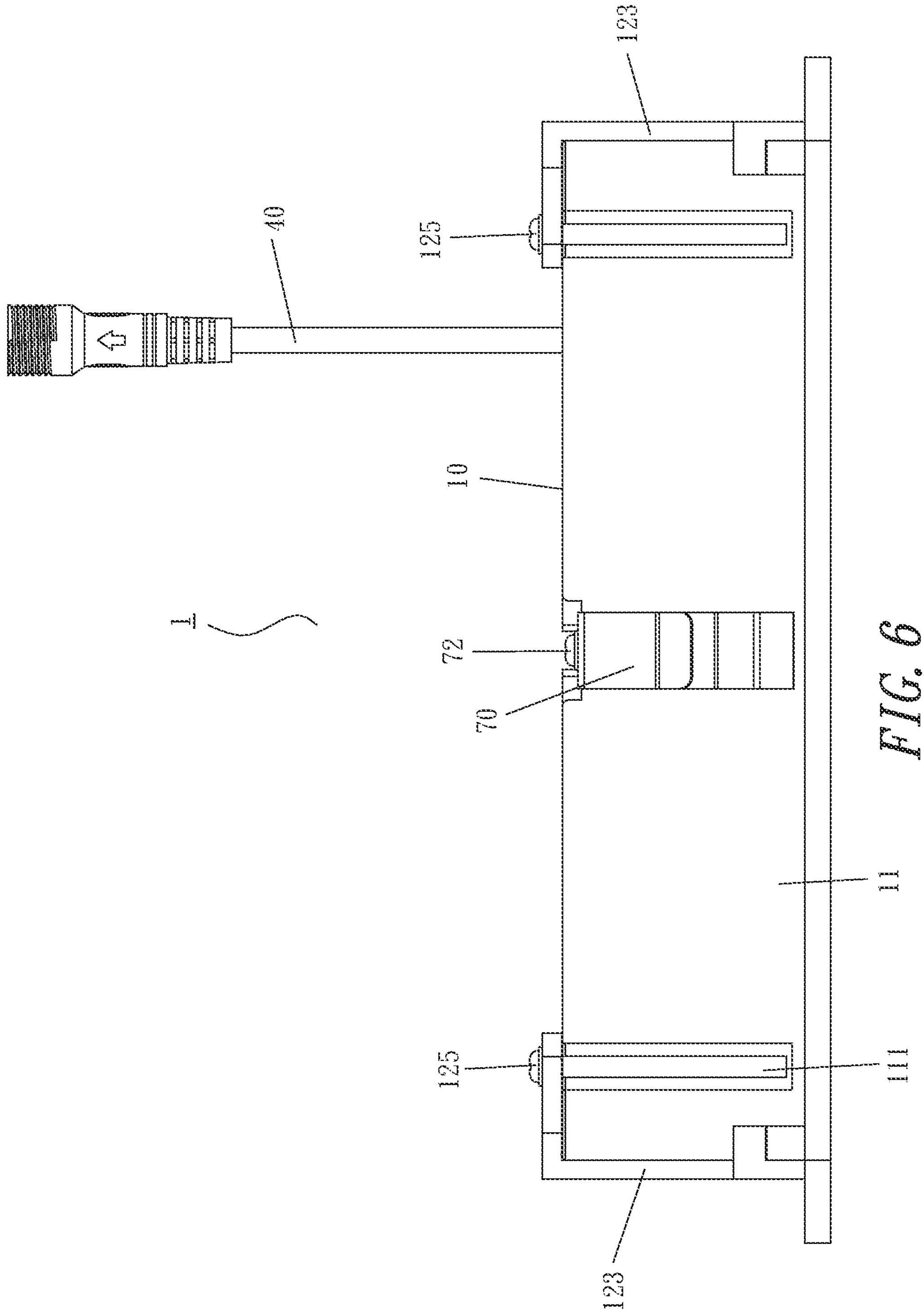
FIG. 6 is a lateral view of the invention.

Based on the structure described above, the appearance of the assembled lamp device 1 is shown in FIG. 1 and FIG. 6. When using the lamp device 1, it is embedded into the slot provided on the ceiling to from a recessed lamp. To install the lamp, firstly press and shrink the spring clip 70, so that the plates of the spring clip 70 move close to each other. Then, push the lamp device 1 (together with the spring clip 70 pressed on both sides) from below the slot of the ceiling into and through the slot, till the shield wall 112 on the bottom of the lamp device 1 is pressed upon the bottom edge of the slot.

As seen from the above descriptions, the present invention claims an easy heat-dissipating lamp structure, which at least comprises an outer shell, a heat dissipator, a light emitting plate, and a power connection cord. The inside of the outer shell is divided into upper half space and lower half space. Inside the upper half space of the outer shell, multiple rib plates are formed. The heat dissipator is in the shape of a flat plate, placed in from the lower half space of the outer shell, and is attached to the lower edge of the multiple rib plates. The light emitting plate is in the shape of a flat plate, made up of a plate body and multiple light-emitting components. The multiple light-emitting components are installed below the plate body. The light emitting plate is placed in from the lower half space of the outer shell, and is attached to and fixed on the bottom face of the heat dissipator. The power connection cord goes from above the outer shell into the space between the rib plates, and is extended to the light-emitting component for electrical connection. The invention is characterized in that: the multiple rib plates inside the outer shell are all formed in the vertical direction, so that vertical gaps are formed between the rib plates. The heat generated by the multiple light-emitting components during operation is received by the heat dissipator and is discharged from the vertical gaps between the multiple rib plates. In short, based on the principle that hot air goes upward, the present invention adopts multiple vertical gaps formed between multiple vertical rib plates configured inside the upper half space of the outer shell of the lamp device, so that the heat can be discharged upward quickly, so as to reduce the heat accumulated around the light-emitting component. The invention can dramatically enhance the heat dissipation effect of the lamp device, and consequently improve the functional performance as well as the service life of the light-emitting lamp device, Although the invention has been explained in relation to its preferred embodiment, it is to be understood that many other possible modifications and variations can be made without departing from the spirit and scope of the invention as hereinafter claimed.

What is claimed is:

1. A heat-dissipating lamp structure, the structure comprising at least an outer shell, a heat dissipator, a light emitting plate, and a power connection cord, the inside of the outer shell is divided into an upper half space and a lower half space inside the upper half space of the outer shell, multiple rib plates are formed, the heat dissipator is in the shape of a flat plate, placed in from the lower half space of the outer shell, and is attached to the lower edge of the multiple rib plates, the light emitting plate is in the shape of a flat plate, made up of a plate body and multiple light-emitting components, the multiple light-emitting components are installed below the plate body, the light emitting plate is placed from the lower half space of the outer shell, and is attached and fixed on a bottom face of the heat dissipator, the power connection cord goes from above the outer shell into a space between at least two of the multiple rib plates, and extends to the light-emitting component for electrical connection, the lamp structure is characterized in that; the multiple rib plates inside the outer shell are all formed in straight shapes extending from top to bottom, straight and vertical gaps are formed between the rib plates, the heat generated by the multiple light-emitting components during operation is received by the heat dissipator, and is discharged through the straight gaps between the multiple rib plates, wherein the outer shell is divided into two long side walls located on left and right sides respectively, two short side walls located on front and rear sides respectively, and the multiple rib plates located inside, an outer face of each of the two long side walls having an insertion slot extending upward at position near the front end and near the rear end, respectively, and a lower end of said outer face of each of the two long side walls extending outward to form a shield wall, the upper half part of each of the two short side walls is a wall body, and the lower half part of each of the two short side walls is a port, the wall body of one short side wall is provided with a crevice, the multiple rib plates are formed between two of the insertion slots on a same side, inside the upper half space of the outer shell, a lower edge on the outside of each insertion slot is formed with a middle plate connected between an outermost rib plate and a corresponding one of the two short side walls, a dent is formed on one middle plate at a position corresponding to the crevice of the one short side wall, and a through hole is formed on the outermost rib plate at the position corresponding to the crevice, the lower half space of the outer shell is communicated to the ports of the front and rear ends, the bottom of the outer shell is configured with multiple first connection slots, a middle position of each outermost rib plate is configured with a second connection slot, and a middle position of the two long side walls is configured with a third connection slot.

2. The heat-dissipating lamp structure of claim 1, wherein the end face of each short side wall is configured to be connected with a corresponding side cap to cover a corresponding wall body of the upper half part, port and crevice of the lower half part, and wherein a face of the side cap is configured with a connection hole, configured to be aligned to a corresponding second connection slot, and a connecting component is configured to extend through the connection hole and be locked with the second connection slot.

3. The heat-dissipating lamp structure of claim 1, wherein the heat dissipator is formed in the shape of a flat plate using aluminum-based materials and includes a plurality of clamping slots corresponding to the positions on two sides corresponding to the insertion slots of the outer shell wherein an open slot is provided respectively on each edge of the two ends corresponding to the two short side walls, a position of one open slot corresponding to the dent, wherein the heat dissipator is sporadically configured with several perforations, and a position of each of the several perforations corresponds to a corresponding first connection slot, wherein during assembly, when the heat dissipator is placed in the outer shell from the lower half space of the outer shell, each of the plurality of clamping slot clamps a corresponding insertion slot, wherein the one open slot is aligned with the dent of the middle plate, the several perforations are all aligned to a corresponding first connection slot, and wherein the light emitting plate is made up of a plate body and multiple light-emitting components, the light emitting components installed below the plate body, a plurality of clamping slots are configured at positions corresponding to positions of the clamping slots of the heat dissipator, wherein an open slot is configured at a position corresponding to an open slot of the heat dissipator on each of two end edges corresponding to the two short side walls, one open slot aligned to the dent, wherein the light emitting plate is sporadically configured with several perforations, the several perforations aligned to corresponding perforations of the heat dissipator, wherein during assembly, when the light emitting plate is placed in the outer shell from the lower half space of the outer shell and is attached on the bottom face of the heat dissipator, the plurality of clamping slots of the light emitting plate and the plurality of clamping slots of the heat dissipator correspondingly clamp a corresponding insertion slot of the outer shell, wherein one open slot of the light emitting plate is aligned to the corresponding one open slot of the heat dissipator and is aligned to the dent of the middle plate of the outer shell, wherein the several perforations of the light emitting plate and the several perforations of the heat dissipator are each aligned to a corresponding first connection slot.

4. The heat-dissipating lamp structure of claim 3, wherein the lamp structure further comprises a reflector plate and a cup plate, wherein a plate body of the reflector plate is arranged with multiple reflectors and multiple connection holes, the multiple reflectors corresponding to the multiple light-emitting components of the light emitting plate, wherein the multiple connection holes correspond to the several perforations of the light emitting plate, wherein a left side and a right side of the reflector plate corresponding to the two long side walls are each formed with a raised plate, wherein during assembly the reflector plate is placed in the outer shell from the lower half space of the outer shell, wherein through holes on the reflector hold the corresponding light-emitting components inside, and wherein a connecting component can be inserted from the downside upward, passing a corresponding one of the multiple connection holes of the reflector plate, the several perforations of the light emitting plate, and the several perforations of the heat dissipator, and lock with the first connection slot.

5. The heat-dissipating lamp structure of claim 4, wherein the lamp structure further comprises a spring clip, the spring clip is a plate extending downward and then outward and upward for several cycles so that the spring clip has elasticity, an inner end face of the spring clip provided with a connection hole, wherein when the inner end face of the spring clip is attached to a central point of one of the two long side walls, the connection hole of the spring clip is aligned with the third connection slot, and a connecting component can be inserted from downside upward, passing through the connection hole of the spring clip, and lock with the third connection slot.

* * * * *